Patented Apr. 2, 1940

2,195,984

UNITED STATES PATENT OFFICE 2,195,984

HALOGENATED PHTHALOCYANINES

Charles Enrique Dent and William Arthur Silvester, Blackley, Manchester, England, assignors to Imperial Chemical Industries Limited, a corporation of Great Britain No Drawing. Application July 6, 1937, Serial No. 152,274. In Great Britain July 14, 1936

6 Claims. (Cl. 260—314)

In co-pending application Serial No. 93,127 in the names of Linstead and Dent there is described the manufacture of compounds, useful as pigments, by chlorinating or brominating a phthalocyanine to such a degree that the number of halogen atoms present is at least eight and preferably ten or more. Various methods have been described whereby the halogenation, i. e., the chlorination or bromination, may be carried out.

The present invention relates to an improvement in carrying into practical effect the chlorination or bromination of phthalocyanines and consists in means whereby the high temperature found to be needed to permit the maximum desirable halogenation to take place may be reached without difficulty; whereby the provision of special apparatus (e. g., pressure vessels for highly corrosive reagents) is avoided; and whereby halogenation to the desired degree is brought about by use of elementary halogen. In this way substances useful as pigments and of an outstandingly brilliant clear green shade are readily obtained.

According to the invention phthalocyanines are chlorinated or brominated in a hot molten phthalic anhydride and by use of elementary chlorine or bromine.

A convenient temperature is that at which the phthalic anhydride is gently boiling in an open vessel. The boiling point of phthalic anhydride itself is 284° C. This temperature is sufficiently high for most purposes contemplated, but a chlorinated phthalic anhydride, of higher boiling point may of course be used. 3-chloro and 4-chlorophthalic anhydrides, and the 3,4, 4,5- and 3,6-dichlorophthalic anhydrides, or other chlorophthalic anhydrides, especially 3,4,5,6-tetrachlorophthalic anhydride, which is readily available in technical practice, may be mentioned in this connexion.

The tendency for phthalic anhydride to sublime, with consequent choking of vents, etc., is such that in practice a somewhat lower temperature than the boiling point under atmospheric pressure is preferred. This may be about 250-260° C. The invention is, of course, not confined to precise limits of temperature.

By way of explanation it will be remarked that the phthalocyanines will dissolve in very few solvents, but they have been found to be soluble to some extent in hot phthalic anhydride. Hence there is a tendency for the difficulties associated with the chemical treatment of a solid with a gas to disappear when a solvent for the two reagents is provided.

Suitable known halogen carriers may be used as additional reagents, being such, for instance, as can be operated with at a high temperature in an open vessel, and such as do not interact, or deleteriously interact with the medium. Phosphorus pentachloride, antimony pentachloride, and ferric trichloride are suitable known halogen carriers for use in this way.

In British specification No. 360,355 a process has been described wherein derivatives of vat dyestuffs and of these intermediate products are halogenated in the presence of an inert medium consisting of phthalic anhydride or a halogenated derivative thereof, and in British specification No. 322,169 certain compounds now known to be copper, iron and nickel phthalocyanines, are said to be capable of being dyed on vegetable fibres from the vat. It was not to be foreseen that by treating these compounds and other phthalocyanines (the term phthalocyanine being now a group name—see Linstead and others, Journal of the Chemical Society, 1934, pages 1016–1039) with chlorine or bromine in the conditions which are features of the present invention there could be obtained green compounds of great value in pigments by reason of their clear and full green shade.

The invention is illustrated but not limited by the following examples in which the parts are by weight.

Example 1

10 parts of metal-free phthalocyanine, $C_{32}H_{16}N_8.H_2$ or $C_{32}H_{18}N_8$, are mixed with 100 parts of phthalic anhydride and the mixture is heated in a vessel provided with a suitable reflux condenser and a stirrer and heated in an oil bath. The temperature is raised to 260° C. and a stream of chlorine is bubbled through the molten mixture for 6 hours, the reaction mixture being stirred continuously. The mass is then cooled, ground, and stirred with warm dilute aqueous caustic soda solution, filtered, and so washed, until all the phthalic anhydride has been removed. The product is finally washed with water and dried.

Alternatively the still molten mass may be run into a large amount of warm water and the mixture cooled and filtered, the residue being washed with hot water until all the phthalic anhydride has been dissolved away. The product is then dried.

The so-obtained product is in the form of a bright green powder, of composition approximately to the formula 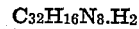$C_{32}H_7N_8Cl_{11}$. It may be obtained in a state of fine division by dissolving it in concentrated sulphuric acid or better, chlorosulphonic acid (in which it dissolves to give a red solution) and pouring the solution into water. The green precipitated pigment is filtered off, washed and dried.

When the above preparation is repeated except that 2 parts of antimony pentachloride are added to the reaction mixture, a product of a yellower shade is obtained. This product contains about 45% of chlorine, i. e., has approximately the composition $C_{32}H_6N_8Cl_{12}$.

*Example 2*

10 parts of copper phthalocyanine, $C_{32}H_{16}N_8Cu$, are heated with 100 parts of phthalic anhydride and 4.6 parts of antimony pentachloride, in a vessel provided with a suitable reflux condenser and a stirrer, and heated by an oil bath. The temperature is raised to 260–270° C. and a stream of chlorine is bubbled through the melt for 6 hours, the reaction mixture being continuously stirred.

The mass is then cooled and worked up as described in Example 1, the procedure there described being followed to obtain the substance in a state of fine division, suitable for use as a pigment. The substance so-obtained contains 49.5% of chlorine and 5.9% of copper, and so is seen to be a mixture of the compounds $C_{32}HN_8Cl_{15}Cu$ and $C_{32}N_8Cl_{16}Cu$. When used as a pigment it gives bright clear green shades.

Instead of antimony pentachloride, either phosphorus pentachloride or ferric chloride may be used.

*Example 3*

10 parts of metal free phthalocyanine are mixed with 100 parts of tetrachlorophthalic anhydride and 2 parts of antimony pentachloride. Chlorination is passed in exactly as described in Example 1 except that the temperature is 290–300° C. The melt is poured into hot dilute aqueous sodium hydroxide solution. The residue is filtered off, thoroughly washed with dilute aqueous sodium hydroxide solution, then with water, and dried. The product may be obtained in a state of fine division by the procedure described in Example 1. It contains about 48% of chlorine. The shade is bright clear yellowish green.

Copper phthalocyanine, similarly treated, gives a product similar to that of Example 2.

*Example 4*

10 parts of copper phthalocyanine are mixed with 100 parts of phthalic anhydride and 2 parts of antimony pentachloride in a vessel provided with a stirrer. The mixture is heated to 250–260° C. and a stream of bromine vapour and nitrogen is passed into it. The gaseous mixture is made by passing nitrogen gas through hot bromine. 48% of bromine are added in this way. The melt is worked up as described in Example 1. The green powder so obtained gives bright bluish green shades when applied as a pigment.

*Example 5*

10 parts of aluminium phthalocyanine are mixed with 100 parts of phthalic anhydride and 2 parts of antimony pentachloride. The chlorination and working up of the product are carried out as described in Example 1.

The so-obtained chlorinated aluminium phthalocyanine (containing about 42% of chlorine) has a particularly bright yellowish green shade.

*Example 6*

10 parts of nickel phthalocyanine are mixed with 100 parts of phthalic anhydride and 2 parts of antimony pentachloride. The chlorination and working up of the product are carried out as described in Example 1.

The so-obtained chlorinated nickel phthalocyanine (containing about 45.5% of chlorine) has a clear green shade.

The present invention is applicable generally to the chorination or bromination of phthalocyanines. Typical phthalocyanines are described in the scientific papers of Linstead and others (see Journal of the Chemical Society, 1934, pages 1016–1039, and 1936, pages 1719–1748). By the invention there is provided a technically feasible method whereby the maximum number of halogen atoms may be introduced by replacement of hydrogen. In this way substances which for all practical purposes can be regarded as pure chemical compounds are obtained which are of great value for use as pigments, being characterised by great purity of green shade combined with great stability, especially fastness to light.

We claim:

1. The process of halogenating a phthalocyanine coloring matter, which comprises reacting upon the same with elemental halogen in a medium consisting essentially of a compound selected from the group consisting of phthalic anhydride and its halogenation derivatives, the reaction being carried out at a temperature between 250° C. and the boiling point of the medium.

2. A process of producing a green pigment of the phthalocyanine series, which comprises suspending a phthalocyanine pigment in a molten phthalic anhydride maintained at a temperature between 200° and 300° C. and containing further a halogen carrier selected from the group consisting of antimony pentachloride, phosphorus pentachloride, and ferric chloride, and passing in a halogenating agent selected from the group consisting of chlorine and bromine, until the original compound has absorbed from 12 to 16 halogen atoms per molecule.

3. The process of producing a highly chlorinated copper-phthalocyanine, which comprises suspending copper phthalocyanine in molten phthalic anhydride in the presence of a halogen carrier, and passing in chlorine until the copper-phthalocyanine has absorbed from 12 to 16 chlorine atoms per molecule.

4. A process as in claim 3, the reaction mass being maintained at a temperature of 250° to 260° C. during the chlorination.

5. The process of producing a highly chlorinated metal-free-phthalocyanine, which comprises suspending metal-free-phthalocyanine in molten phthalic anhydride in the presence of a halogen carrier, and passing in chlorine until the metal-free-phthalocyanine has absorbed from 12 to 16 chlorine atoms per molecule.

6. The process of producing a highly chlorinated nickel-phthalocyanine, which comprises suspending nickel-phthalocyanine in molten phthalic anhydride in the presence of a halogen carrier, and passing in chlorine until the nickel-phthalocyanine has absorbed from 12 to 16 chlorine atoms per molecule.

CHARLES ENRIQUE DENT.
WILLIAM ARTHUR SILVESTER.